(12) United States Patent
Ban (10) Patent No.: US 8,508,279 B2
(45) Date of Patent: Aug. 13, 2013

(54) SEMICONDUCTOR DEVICE, AND METHOD OF DIAGNOSING ABNORMALITY OF BOOSTING CIRCUIT OF SEMICONDUCTOR DEVICE

(75) Inventor: Masafumi Ban, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 0 days.

(21) Appl. No.: 13/236,270

(22) Filed: Sep. 19, 2011

(65) Prior Publication Data

US 2012/0081167 A1 Apr. 5, 2012

(30) Foreign Application Priority Data

Sep. 30, 2010 (JP) ................................. 2010-221807

(51) Int. Cl.
*H03L 5/00* (2006.01)
(52) U.S. Cl.
USPC .............................. 327/333; 327/20; 327/121
(58) Field of Classification Search
USPC ............... 327/20, 50, 306, 333, 589; 307/63, 307/77, 78; 320/121
See application file for complete search history.

(56) References Cited

U.S. PATENT DOCUMENTS

2011/0260770 A1* 10/2011 Sekiguchi ..................... 327/333

* cited by examiner

*Primary Examiner* — Long Nguyen
(74) *Attorney, Agent, or Firm* — Studebaker & Brackett PC (57) ABSTRACT

The battery monitoring IC is provided with the short circuiting switch that includes the switching element that shorts the input side and the output side of the boosting circuit that boosts the power supply voltage to the driving voltage, that can drive the MOS transistor within the buffer amplifier in the saturated region, and supplies the driving voltage as the driving voltage of the buffer amplifier. An abnormality of the boosting circuit can be diagnosed by comparing the output voltage, that is measured when the short circuiting switch is turned off and the driving voltage boosted by the boosting circuit is supplied to the buffer amplifier, and the output voltage, that is measured when the short circuiting switch is turned on and the power supply voltage is, without going through the boosting circuit, supplied as is to the buffer amplifier.

20 Claims, 6 Drawing Sheets

SEMICONDUCTOR DEVICE, AND METHOD OF DIAGNOSING ABNORMALITY OF BOOSTING CIRCUIT OF SEMICONDUCTOR DEVICE

CROSS-REFERENCE TO RELATED APPLICATION

This application is based on and claims priority under 35 USC 119 from Japanese Patent Application No. 2010-221807 filed on Sep. 30, 2010, the disclosure of which is incorporated by reference herein.

BACKGROUND

1. Technical Field

The present invention relates to a semiconductor device and a method of diagnosing a boosting circuit of a semiconductor device, and in particular, relates to a semiconductor device for battery monitoring and a method of diagnosing an abnormality of a boosting circuit of a semiconductor device for battery monitoring.

2. Related Art

Generally, there are semiconductor devices for carrying out monitoring and control of plural batteries that are connected in series. A battery monitoring IC (Integral Circuit) for monitoring and controlling a battery that is installed in a vehicle or the like for example, is known as such a semiconductor device for battery monitoring.

SUMMARY

Figure 6:
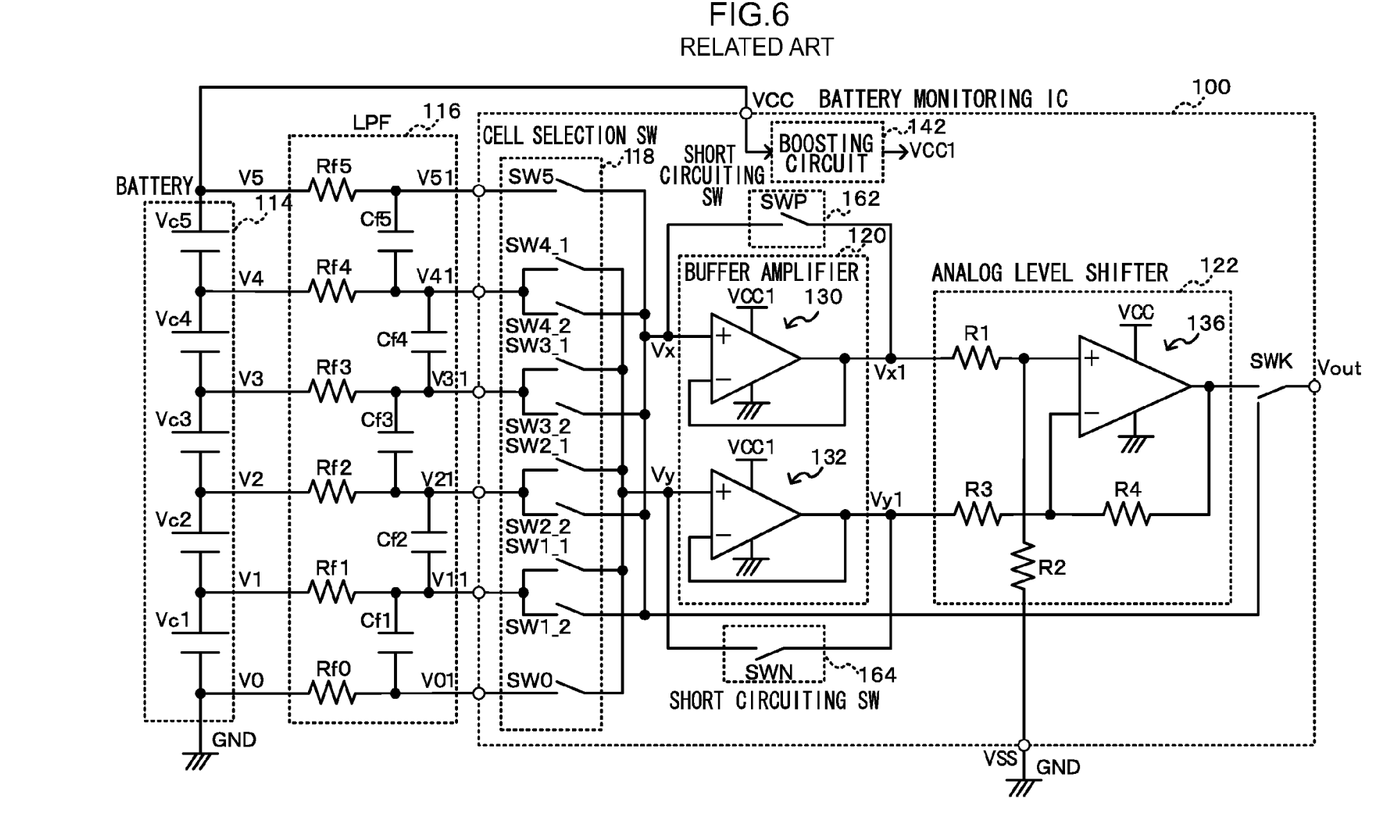
FIG. 6 is a circuit diagram showing an example of the schematic structure of a conventional semiconductor device.

The semiconductor device disclosed in Japanese Patent Application No. 2010-102385, that the present applicant filed previously, is such a battery monitoring IC. An example of the schematic structure of this semiconductor device is shown in FIG. 6. A semiconductor device 100 shown in FIG. 6 is structured to have a cell selection SW 118, a buffer amplifier 120, an analog level shifter 122, and a boosting circuit 142.

A battery 114 includes five battery cells Vc1 through Vc5 that are connected in series, and the negative electrode of the battery cell Vc1 is connected to GND (ground). Further, the positive electrode of the battery cell Vc5 is connected to a power supply voltage VCC of the battery monitoring IC 100. Both-end voltages V0 through V5 of the battery 114 are connected to inputs of the cell selection SW 118 of the battery monitoring IC 100 via respective LPFs (low-pass filters) 116. The outputs of the cell selection switch 118 are connected to the buffer amplifier 120 (buffer amplifier 130, buffer amplifier 132). The outputs of the buffer amplifier 120 are connected to the analog level shifter 122. The analog level shifter 122 is structured to have detection resistors R1 through R4 and an amplifier 136. Further, the boosting circuit 142 has the functions of boosting the power supply voltage VCC, that is supplied from the positive electrode side of the battery cell Vc5 of the battery 114, to driving voltage VCC1, and supplying the driving voltage VCC1 as driving voltage of the buffer amplifier 130 and the buffer amplifier 132 of the buffer amplifier 120.

Measurement of the battery voltage of the battery 114 by the convention battery monitoring IC 100 is described. When measuring the voltage value of the battery cell Vc1, switching elements SW1_2, SW0 of the cell selection SW 118 are turned on, and the other switching elements are turned off. Voltage Vc1=V1−V0 of the battery cell Vc1 is voltage-converted by the analog level shifter 122, and Vout becomes Vout=Vc1, and is converted into voltage of the GND reference.

Similarly, when measuring the voltage of the battery cell Vc2, switching elements SW2_2, SW1_1 of the cell selection SW 118 are turned on, and the other switching elements are turned off, and are voltage-converted by the analog level shifter 122, and Vout becomes Vout=Vc2. When measuring the voltage of the battery cell Vc3, switching elements SW3_2, SW2_1 of the cell selection SW 118 are turned on, and the other switching elements are turned off, and are voltage-converted by the analog level shifter 122, and Vout becomes Vout=Vc3. When measuring the voltage of the battery cell Vc4, switching elements SW4_2, SW3_1 of the cell selection SW 118 are turned on, and the other switching elements are turned off, and are voltage-converted by the analog level shifter 122, and Vout becomes Vout=Vc4. When measuring the voltage of the battery cell Vc5, switching elements SW5, SW4_1 of the cell selection SW 118 are turned on, and the other switching elements are turned off, and are voltage-converted by the analog level shifter 122, and Vout becomes Vout=Vc5.

Here, in the case of measuring the voltage of the battery cell Vc5, when the power supply voltage VCC is not boosted by the boosting circuit 42 and is supplied as is to the buffer amplifier 130, the buffer imp 132 of the buffer amplifier 120, at the buffer amplifier 130, Vx=V5=VCC, and the input voltage and the power supply voltage (driving voltage) become the same, and the transistor within the buffer amplifier 130 operates in a non-saturated region, and offset voltage Vos of output Vx1 of the buffer amplifier 130 becomes large. As a result, there are cases in which the accuracy of measuring the battery voltage by the output voltage Vout deteriorates. Therefore, in the semiconductor device 100, the power supply voltage VCC is boosted by the boosting circuit 142 to the driving voltage VCC1 that can make the transistor within the buffer amplifier 130 operate in the saturated region, and the driving voltage VCC1 is supplied to the buffer amplifier 130. Due thereto, the offset voltage Vos of the buffer amplifier 130 is suppressed, and the accuracy of measuring the battery voltage by the output voltage Vout is improved.

In the above-described semiconductor device 100, when measuring the voltage of the battery cell Vc5, if voltage, at which the output voltage Vout is thought to be abnormal, is measured, the place where the defect has arisen cannot be specified, and it is uncertain as to whether the output voltage Vout has become abnormal because the power supply voltage VCC was supplied to the buffer amplifier 130 without being boosted appropriately to the driving voltage VCC1 due to an abnormality (defect) of the boosting circuit 142, or whether the output voltage Vout has become abnormal due to an abnormality (defect) at another portion such as the analog level shifter 122 or the like.

The present invention is proposed in order to overcome the above-described problem, and an object thereof is to provide a semiconductor device and a method of diagnosing an abnormality of a boosting circuit of a semiconductor device, that can diagnose an abnormality of a boosting circuit provided at a semiconductor device.

In order to achieve the above-described object, a first aspect of the present invention provides a semiconductor device including:

plural switching elements that are connected via a low-pass filter respectively to plural batteries connected in series, and that select any one of the plural batteries connected in series;

a first buffer amplifier that is structured to include a transistor driven by power supply voltage supplied from the plural batteries connected in series, and to which voltage of one end of a battery selected by the switching elements is inputted, and that has an input impedance of a magnitude that limits current that flows from the low-pass filter to the switching elements;

a second buffer amplifier that is structured to include a transistor driven by the power supply voltage, and to which voltage of another end of the battery selected by the switching elements is inputted, and that has an input impedance of a magnitude that limits current that flows from the low-pass filter to the switching elements;

a level shifter that is driven by the power supply voltage, and that outputs a difference between a voltage outputted from the first buffer amplifier and a voltage outputted from the second buffer amplifier;

a boosting section that boosts the power supply voltage to a voltage value for operating, in a saturated region, the transistor included in the first buffer amplifier and the transistor included in the second buffer amplifier; and a short circuiting element that short-circuits an input side and an output side of the boosting section on the basis of a control signal.

A second aspect of the present invention provides a method of diagnosing an abnormality of a boosting section of a semiconductor device, the method including:

in the semiconductor device of the first aspect, on the basis of a power supply voltage that is supplied via the boosting section and that has been boosted to a voltage value for operating the transistor included in the first buffer amplifier and the transistor included in the second buffer amplifier in a saturated region, driving the first buffer amplifier and the second buffer amplifier, and measuring a first voltage value of a battery;

in the semiconductor device, on the basis of the power supply voltage that short-circuits the input side and the output side of the boosting section by the short circuiting element and that is supplied without having gone through the boosting section, driving the first buffer amplifier and the second buffer amplifier, and measuring a second voltage value of the battery; and comparing the first voltage value and the second voltage value.

In accordance with the present invention, there is the effect that an abnormality of a boosting circuit provided at a semiconductor device can be diagnosed.

BRIEF DESCRIPTION OF THE DRAWINGS

Exemplary embodiments of the present invention will be described in detail based on the following figures, wherein.

DETAILED DESCRIPTION

A semiconductor device for battery monitoring of the present exemplary embodiment is described in detail hereinafter with reference to the drawings.

Figure 1:
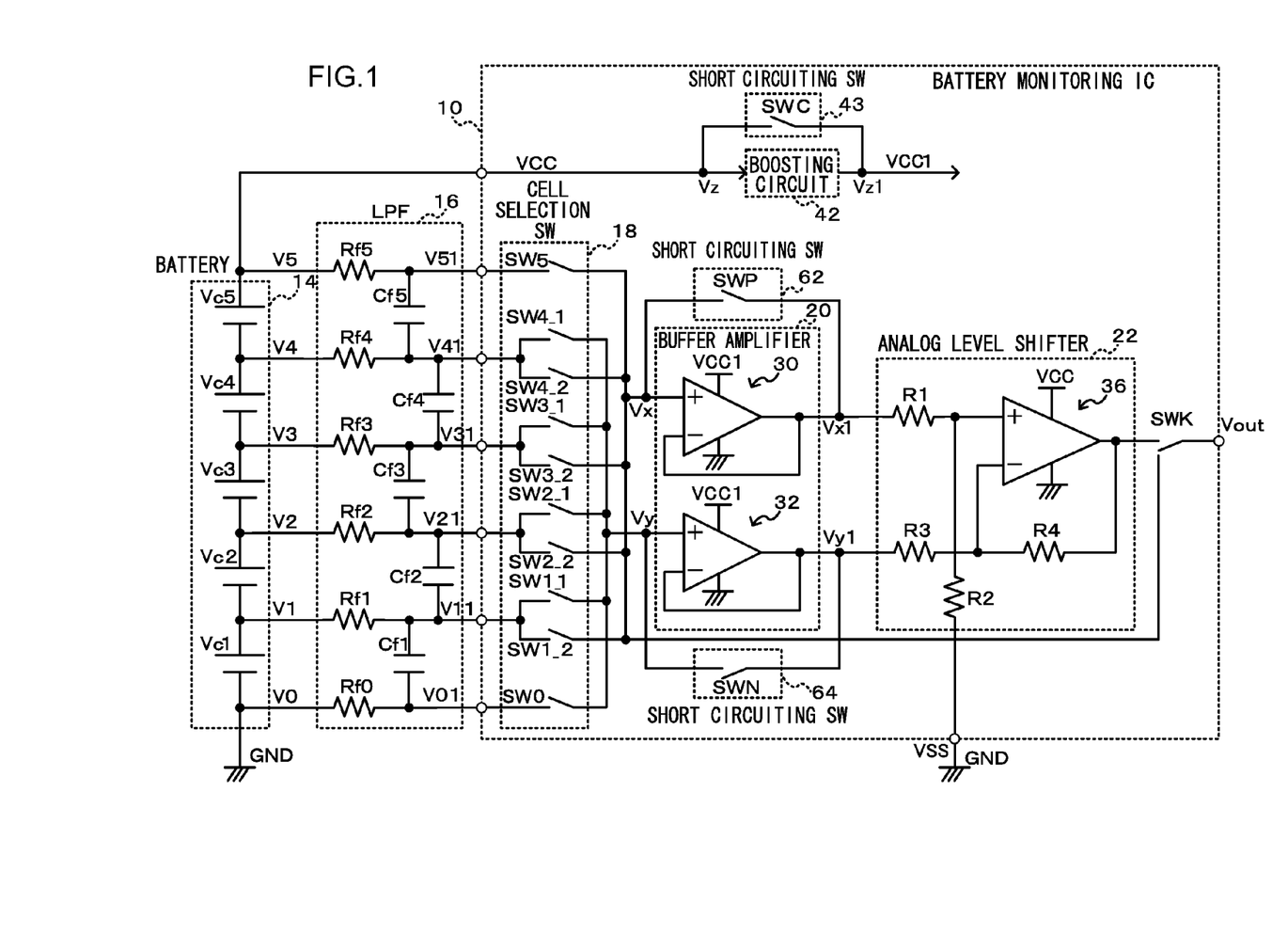
FIG. 1 is a circuit diagram showing an example of the schematic structure of a semiconductor device relating to an exemplary embodiment.

A circuit diagram of an example of the schematic structure of a semiconductor device (battery monitoring IC) of the present exemplary embodiment is shown in FIG. 1. A battery monitoring IC 10 of the present exemplary embodiment is structured to have a cell selection SW 18, a buffer amplifier 20, and an analog level shifter 22. The buffer amplifier 20 is structured to include a buffer amplifier 30, a buffer amplifier 32, a boosting circuit 42, and a short circuiting SW 43 that is used at the time of diagnosing an abnormality of the boosting circuit 42. The analog level shifter 22 structures a differential amplification circuit from detection resistors R1, R2, R3, R4 and an amplifier 36.

A battery 14 includes five battery cells Vc1 through Vc5 that are connected in series, and the negative electrode of the battery cell Vc1 is connected to GND. Further, the positive electrode of the battery cell Vc5 is connected to the power supply of the battery monitoring IC 10. Both ends of the respective battery cells Vc1 through Vc5 are connected to switching elements SW0 through SW5 of the cell selection SW 18 of the battery monitoring IC 10, via an LPF 16 that is structured from capacitors Cf1 through Cf5 and resistors Rf0 through Rf5, such that both-end voltages V0 through V5 are inputted.

Figure 2:
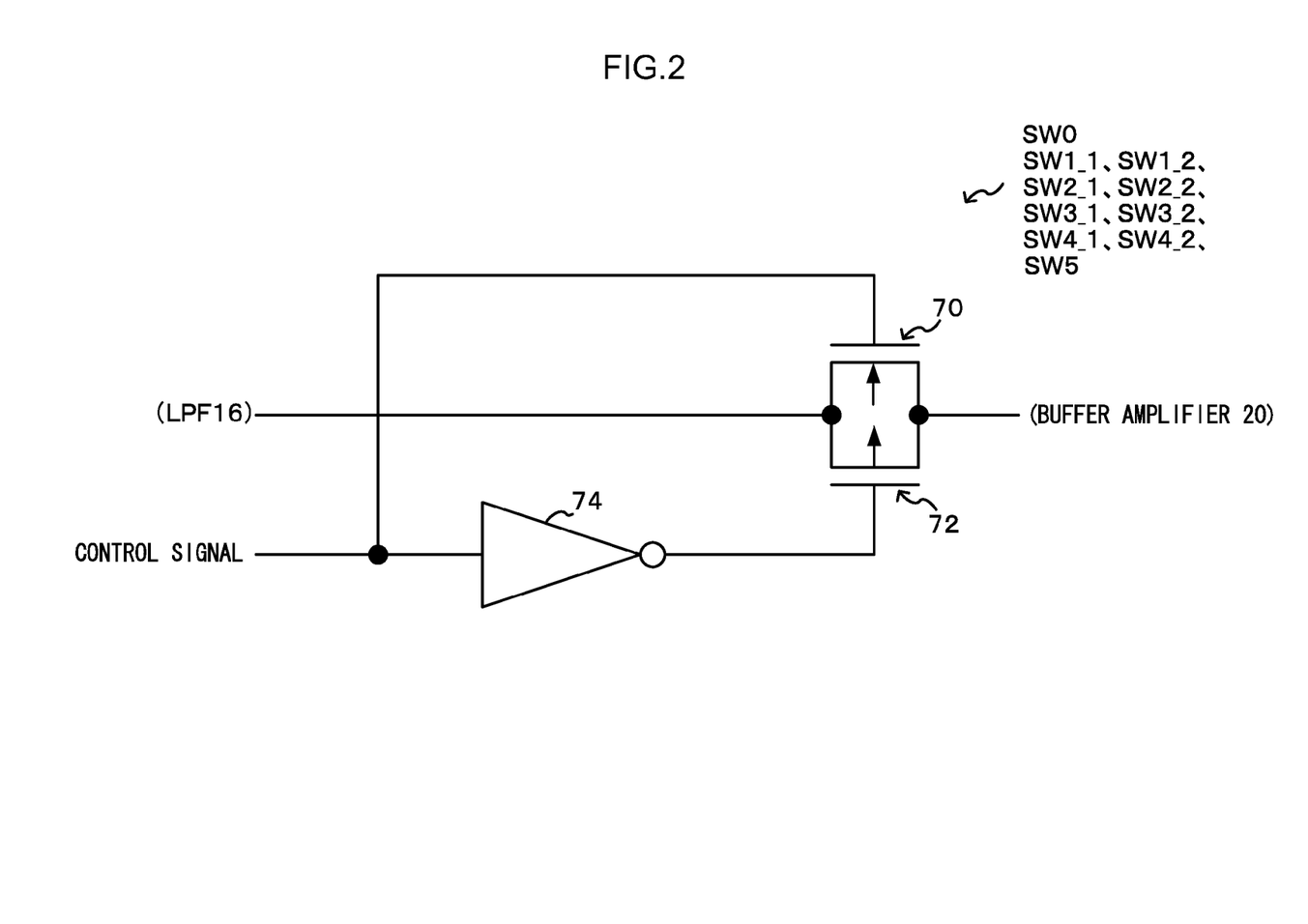
FIG. 2 is a circuit diagram showing a concrete example of the schematic structure of a cell selection switch.

The cell selection SW 18 is structured to include the switching elements SW0 through SW5 for selecting the respective battery cells Vc1 through Vc5. In the present exemplary embodiment, the switching elements SW0 through SW5 all have similar structures, and are structured by high breakdown voltage MOS transistors. A circuit diagram of a concrete example of the switching elements SW0 through SW5 of the present exemplary embodiment is shown in FIG. 2. The switching elements SW0 through SW5 of the present exemplary embodiment are structured to include an NMOS transistor 70, a PMOS transistor 72, and a NOT circuit 74. When the control signal inputted to the NOT circuit 74 is high-level, the NMOS transistor 70 and the PMOS transistor 72 are turned on, and voltage is outputted from the LPF 16 to the buffer amplifier 20. On the other hand, when the control signal inputted to the NOT circuit 74 is low-level, the NMOS transistor 70 and the PMOS transistor 72 are turned off, and voltage is not outputted from the LPF 16 to the buffer amplifier 20. Note that the switching elements SW0 through SW5 are not limited to this and may be another structure, provided that they are structured by high breakdown voltage transistors.

The outputs of the cell selection SW 18 are connected to the non-inverting terminals of the buffer amplifier 20. In the present exemplary embodiment, the switching elements SW0, SW1_1, SW 2_1, SW 3_1, SW 4_1 of the cell selection SW 18 are connected to the non-inverting input terminal of the buffer amplifier 32, and the switching elements SW 1_2, SW 2_2, SW 3_2, SW 4_2, SW5 are connected to the non-inverting input terminal of the buffer amplifier 30. Note that the respective outputs are connected (negatively fed-back) to the inverting terminals of the buffer amps 30, 32.

Figure 3:
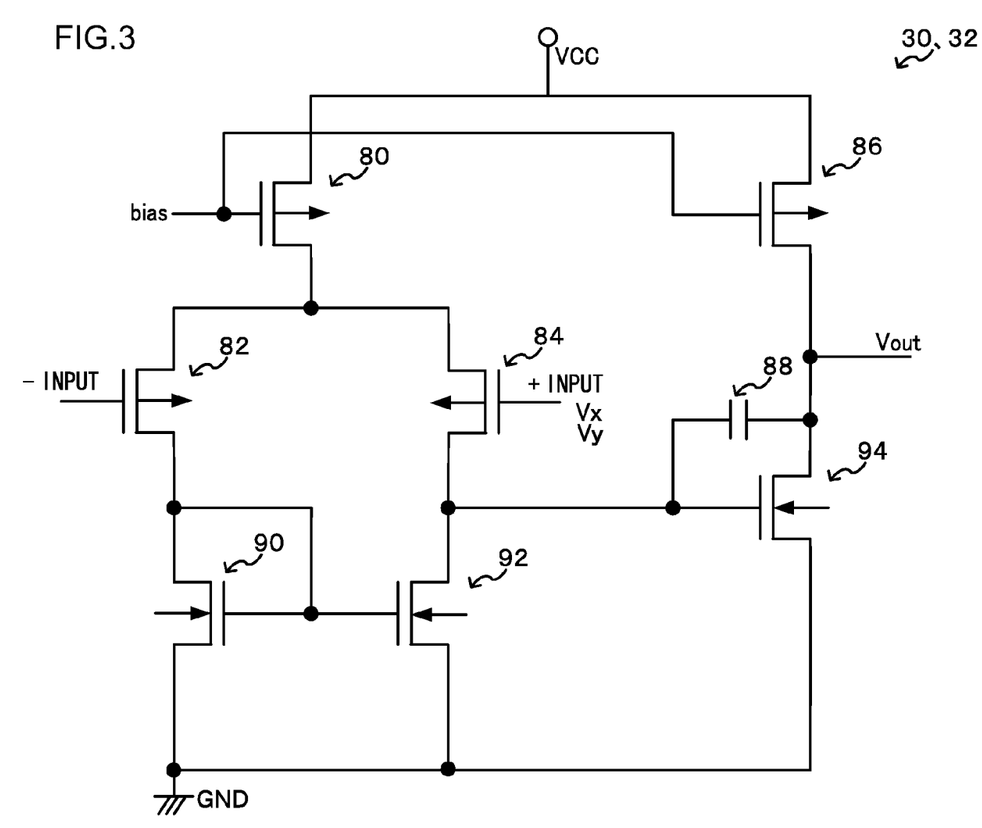
FIG. 3 is a circuit diagram showing a concrete example of the schematic structure of a buffer amplifier.

In the present exemplary embodiment, the buffer amps 30, 32 have similar structures, and are structured by high breakdown voltage MOS transistors. A circuit diagram of a concrete example of the buffer amps 30, 32 of the present exemplary embodiment is shown in FIG. 3. The buffer amps 30, 32 of the present exemplary embodiment are structured to include PMOS transistors 80, 82, 84, 86, a capacitor 88, and NMOS transistors 90, 92, 94. In the present exemplary embodiment, voltages Vx1, Vy1, whose voltage values are the same as voltages Vx, Vy that are inputted from the non-inverting terminals (Vx=Vx1, Vy=Vy1), are outputted from the output terminals. Note that the buffer amps 30, 32 are not limited to this and may be another structure, provided that they are structured by high breakdown voltage transistors.

The outputs of the buffer amplifier 20 are connected to the analog level shifter 22. In the present exemplary embodiment, the output (Vx1) of the buffer amplifier 30 is connected to the non-inverting terminal of the amplifier 36 via the detection resistor R1, and the output (Vy1) of the buffer amplifier 32 is connected to the inverting terminal of the amplifier 36.

The boosting circuit 42 has the functions of boosting the power supply voltage VCC, that is supplied from the positive electrode side of the battery cell Vc5 of the battery 14, to a predetermined driving voltage VCC1 (VCC<VCC1), and supplying the boosted voltage VCC1 as driving voltage of the buffer amps 30, 32 of the buffer amplifier 20. Further, the short circuiting SW 43 is a switch that is turned on or off in accordance with a control signal or the like inputted from the exterior of the battery monitoring IC 10 when diagnosing abnormalities of the boosting circuit 42, and due thereto, the driving voltage that is supplied to the buffer amplifier 30 is switched to either the driving voltage VCC1, that was boosted by the boosting circuit 42, or the power supply voltage VCC.

The analog level shifter 22 has the function of outputting the difference in the voltage values of the both-end voltages of the battery cell selected by the cell selection SW 18, to the exterior of the battery monitoring IC 10 as Vout. A structure having the amplifier 36 that has a similar structure as the buffer amps 30, 32 (see FIG. 3), and the detection resistors R1 through R4 whose resistance values are the same (R1=R2=R3=R4), is a concrete example of the analog level shifter 22 of the present exemplary embodiment.

Operation of the battery monitoring IC 10 of the present exemplary embodiment is described.

First, measurement of the battery voltages of the battery cells Vc1 through Vc5 by the battery monitoring IC 10 of the present exemplary embodiment is described. When measuring the voltage value (V1−V0=Vc1) of the battery cell Vc1, the switching elements SW1_2, SW0 of the cell selection SW 18 are turned on, and the other switching elements are turned off. Because the input impedances of the buffer amps 30, 32 are high, there is no drop in voltage due to the cell selection SW 18 (the switching elements SW1_2, SW0) and the resistors Rf4, Rf5 due to current, and therefore, the voltage Vx becomes Vx=V1 and the voltage Vy becomes Vy=V0. Accordingly, the output Vout of the analog level shifter 22 becomes V1−V0=Vc1, and is converted to the ground reference voltage and outputted to the exterior.

Similarly, when measuring the voltage of the battery cell Vc2, the switching elements SW2_2, SW1_1 of the cell selection SW 18 are turned on, the other switching elements are turned off, and Vout=Vc2 is outputted from the analog level shifter 22. When measuring the voltage of the battery cell Vc3, the switching elements SW3_2, SW2_1 of the cell selection SW 18 are turned on, the other switching elements are turned off, and Vout=Vc3 is outputted from the analog level shifter 22. When measuring the voltage of the battery cell Vc4, the switching elements SW4_2, SW3_1 of the cell selection SW 18 are turned on, the other switching elements are turned off, and Vout=Vc4 is outputted from the analog level shifter 22. When measuring the voltage of the battery cell Vc5, the switching elements SW5, SW4_1 of the cell selection SW 18 are turned on, the other switching elements are turned off, and Vout=Vc5 is outputted from the analog level shifter 22.

At the battery monitoring IC 10 of the present exemplary embodiment, in a case of measuring the battery voltage of the battery cell Vc5, when the power supply voltage VCC is supplied to the buffer amplifier 30 and the buffer amplifier 32 of the buffer amplifier 20 as is without being boosted by the boosting circuit 42, the input voltage Vx of the buffer amplifier 30 that is connected to the positive electrode side of the battery cell Vc5 becomes Vx=V5=VCC. In this way, there is the driving voltage VCC at which the voltage value of the input voltage of the buffer amplifier 30 and the voltage value of the driving voltage of the buffer amplifier 30 become the same power supply voltage VCC, and therefore, the MOS transistor within the buffer amplifier 30 operates in the non-saturated region, and the offset voltage Vos of the output of the buffer amplifier 30 becomes large. There are cases in which, due to the effects of the offset voltage Vos, the accuracy of measuring the battery voltage by the output voltage Vout deteriorates.

Thus, in the present exemplary embodiment, the power supply voltage VCC is boosted by the boosting circuit 42 to the driving voltage VCC1 that makes the MOS transistor within the buffer amplifier 30 operate in the saturated region, and the boosted driving voltage VCC1 is supplied as the driving voltage of the buffer amps 30, 32. Due thereto, the MOS transistor that structures the buffer amplifier 30 operates in the saturated region. Therefore, the offset voltage Vos is suppressed, effects of the offset voltage Vos on the output voltage Vx1 of the buffer amplifier 30 disappear, and the accuracy of measurement of the battery voltage by the output voltage Vout outputted from the analog level shifter 22 improves.

Note that it suffices for the boosting of the power supply voltage VCC by the boosting circuit 42 to be boosting to the driving voltage VCC1 that can make the MOS transistors that structure the buffer amps 30, 32 operate in the saturated region. As a concrete example, when the power supply voltage VCC is VCC=60 V and that voltage value is outside of the saturated region of the MOS transistors, it suffices to boost the power supply voltage VCC to greater than or equal to the driving voltage VCC1=65 V or more that causes the MOS transistors to operate in the saturated region. Note that it suffices to set the concrete voltage value in accordance with the specifications of the MOS transistors.

Further, the battery monitoring IC 10 of the present exemplary embodiment is structured to have a switching element SWK. The switching element SWK has the function of switching between making the output voltage Vout, that is outputted from a battery monitoring IC 50, be the voltage that is outputted from the analog level shifter 22 or be the voltage Vx. Note that, although the switching element SWK is not an essential structure, there are cases in which the accuracy of measuring the battery voltage is improved as will be described hereinafter by providing the switching element SWK, and therefore, it is preferable to provide the switching element SWK.

When measuring the battery voltage of the battery cell Vc1 of the battery 14, because the negative electrode side of the battery cell Vc1 is connected to GND, the input voltage Vy of the buffer amplifier 32, that is connected to the negative electrode side of the battery cell Vc1, becomes input voltage Vy=GND. Because the voltage value (GND) of the input voltage of the buffer amplifier 32 and GND of the buffer amplifier 32 are the same in this way, the MOS transistor within the buffer amplifier 32 operates in the non-saturated region, and the offset voltage Vos of the output of the buffer amplifier 32 becomes large. Therefore, due to the effects of this offset voltage Vos, there are cases in which the accuracy of measuring the battery voltage by the output voltage Vout deteriorates. Therefore, when measuring the battery voltage of the battery cell Vc1, the switching elements SW0, SW1-2 of the cell selection SW 18 are turned on, and the output voltage Vout that is outputted to the exterior of the battery monitoring IC 50 is switched by the switching element SWK from the voltage, that is outputted from the analog level shifter 22 via the buffer amplifier 32, to the voltage Vx. Due thereto, the accuracy of measuring the battery voltage by the output voltage Vout is improved because the positive electrode side of the battery cell Vc1 is directly connected to the output terminal from which the output voltage Vout is outputted, without using the buffer amplifier 32 that operates in the non-saturated region.

Still further, the battery monitoring IC 10 of the present exemplary embodiment is structured to include short circuiting SW 62, 64 for connecting the output terminals and the input terminals of the buffer amps 30, 32. The short circuiting SW 62, 64 have the functions of short circuiting the buffer amps 30, 32 respectively, and turning the buffer amps 30, 32 off. Note that the short circuiting SW 62, 64 are not essential structures. However, by providing the short circuiting SW 62, 64, there are cases in which the buffer amps 30, 32 become abnormal and the accuracy of measuring the battery voltage decreases as described hereinafter, and therefore, it is preferable to provide the short circuiting SW 62, 64.

The outputs of the cell selection SW 18 are connected to the analog level shifter 22 via the buffer amps 30, 32. Therefore, when the buffer amps 30, 32 are not operating normally (when the buffer amps 30, 32 are abnormal), there are cases in which the output voltage Vout does not become an appropriate voltage value, and the accuracy of measuring the battery voltage deteriorates. In such a case, switching elements SWP, SWN of the short circuiting SW 62, 64 are turned off, and usual measurement of the battery voltages of the battery cells Vc1 through Vc5 via the buffer amps 30, 32 is carried out. Further, the switching elements SWP, SWN of the short circuiting SW 62, 64 are turned on, and measurement of the battery voltages of the battery cells Vc1 through Vc5 is carried out without going through the buffer amps 30, 32. The results of both measurements are compared, and, when the measured values coincide (including cases in which the measured values are within a predetermined allowed error range), the buffer amps 30, 32 are considered to be abnormal. On the other hand, if the measured values do not coincide, the buffer amps 30, 32 are considered to be operating normally. Because self-judgment of the operations of the buffer amps 30, 32 is possible in this way, the accuracy of measuring the battery voltage can be prevented from deteriorating.

At the battery monitoring IC 10 of the present exemplary embodiment, by measuring the voltage value of the output voltage Vout that is outputted from the battery monitoring IC 10 as described above, measurement of the battery voltages of the battery cells Vc1 through Vc5 is carried out. This is used in, for example, measurement of a battery that is installed in a car or the like (a storage battery or the like for an electric automobile or a hybrid electric automobile).

Diagnosis of an abnormality of the boosting circuit 42 that is provided at the battery monitoring IC 10 of the present exemplary embodiment is described next. Note that, in the battery monitoring IC 10 of the present exemplary embodiment, at times of measurement of the voltage of the battery cell Vc5 of the battery 14, if the output voltage Vout exhibits a value that is thought to be abnormal, diagnosis of an abnormality of the boosting circuit 42 is carried out. The diagnosing of an abnormality of the boosting circuit 42 is carried out by comparing the output voltage Vout (hereinafter called Vout (swon)) that is outputted from the battery monitoring IC 10 when, in the measuring of the voltage of the battery cell Vc5, the short circuiting SW 43 is turned on and the power supply voltage VCC is supplied as is as the driving voltage of the buffer amplifier 30 without going through the boosting circuit 42 (with the boosting circuit 42 off), and the output voltage Vout (hereinafter called Vout(swoff)) that is outputted from the battery monitoring IC 10 when the short circuiting SW 43 is turned on and the driving voltage VCC1 obtained by the power supply voltage VCC being boosted is supplied as the driving voltage of the buffer amplifier 30 via the boosting circuit 42 (with the boosting circuit 42 on).

Here, the relationship between abnormalities of the boosting circuit 42, and the output voltage Vout(swon) and the output voltage Vout(swoff), is described.

First, a case in which the boosting circuit 42 is operating normally is described. Because the driving voltage VCC1, that is obtained by the power supply voltage VCC being boosted by the boosting circuit 42, is supplied to the buffer amplifier 30, the offset voltage Vos is suppressed, the output voltage Vx1 of the buffer amplifier 30 becomes an appropriate voltage value, and effects of the offset voltage Vos on the output voltage Vout(swoff) are suppressed. Here, when the short circuiting SW 43 is turned on and the power supply voltage VCC is supplied to the buffer amplifier 30 as is without going through the boosting circuit 42, the input voltage Vx becomes Vx=V5=VCC, and the input voltage and the driving voltage become the same, and therefore, the offset voltage Vos becomes large. Thus, the output voltage Vx1 becomes a voltage value to which that offset voltage Vos is added, and the output voltage Vout(swon) as well becomes a voltage value to which the offset voltage Vos is added. Accordingly, a state arises in which the output voltage Vout (swoff)≠the output voltage Vout(swon).

A case in which an abnormality arises at the boosting circuit 42 and the boosting circuit 42 does not operate normally is described next. Note that because there are plural types of abnormal states of the boosting circuit 42, description is given hereinafter per type of abnormal state.

There is an abnormal state in which the boosting circuit 42 does not operate at all. Namely, this is a case in which the power supply voltage VCC=the driving voltage VCC1. In such a case, both when the short circuiting SW 43 is turned on and the power supply voltage VCC does not go through the boosting circuit 42, and when the short circuiting SW 43 is turned off and the power supply voltage VCC goes through the boosting circuit 42, the power supply voltage VCC is supplied as is to the buffer amplifier 30 as driving voltage. Accordingly, a state arises in which the output voltage Vout (swon)=the output voltage Vout(swoff), and in this case, it can be diagnosed that there is an abnormal state.

Further, there is an abnormal state in which the boosting circuit 42 boosts the power supply voltage VCC to a voltage value that is higher than the set value (the driving voltage VCC1) that was originally set. In this case, the boosted voltage value is a value that is higher than the driving voltage VCC1 that can drive the MOS transistor within the buffer amplifier 30 in the saturated region. Therefore, also when a driving voltage of such a voltage value is supplied to the buffer amplifier 30, the MOS transistor within the buffer amplifier 30 can be driven in the saturated region, in the same way as when the boosting circuit 42 operates normally. Accordingly, generation of the offset voltage Vos is suppressed, and, in the same way as when the boosting circuit 42 operates normally, a state arises in which the output voltage Vout(swoff)≠the output voltage Vout(swon). Note that the present exemplary embodiment is structured such that this abnormal state is not diagnosed. However, in such an abnormal state, the accuracy of measuring the output voltage Vout does not deteriorate, and therefore, this abnormal state does not affect measurement of the voltage of the battery cell.

Further, there is an abnormal state in which the boosting circuit 42 boosts the power supply voltage VCC to a voltage value that is lower than the set value (the driving voltage VCC1) that was originally set, but the boosted voltage value is a voltage value at which the MOS transistor within the buffer amplifier 30 can operate in the saturated region. In this case, the MOS transistor within the buffer amplifier 30 can be driven in the saturated region, in the same way as the above-described abnormal state in which the boosting circuit 42 boosts the power supply voltage VCC to a voltage value that is higher than the driving voltage VCC1. Accordingly, generation of the offset voltage Vos is suppressed, and a state arises in which the output voltage Vout(swoff)≠the output voltage Vout(swon). Note that the present exemplary embodiment is structured such that this abnormal state is not diagnosed. However, in such an abnormal state, the accuracy of measuring the output voltage Vout does not deteriorate, and therefore, this abnormal state does not affect measurement of the voltage of the battery cell.

Further, there is an abnormal state in which, although the boosting circuit 42 boosts the power supply voltage VCC, the power supply voltage VCC is boosted to a voltage value of an extent that cannot operate the MOS transistor within the buffer amplifier 30 in the saturated region. In this case, because the boosted voltage value cannot drive the MOS transistor within the buffer amplifier 30 in the saturated region, offset voltage arises at the buffer amplifier 30. However, because the MOS transistor within the buffer amplifier 30 is driven by a voltage of a higher voltage value than the power supply voltage VCC, the generated offset voltage Vos (hereinafter called offset voltage Vos(swoff)) becomes smaller than the offset voltage Vos (hereinafter called offset voltage Vos(swon)) that is generated when the short circuiting SW 43 is turned on and the power supply voltage VCC is supplied to the buffer amplifier 30 as is without going through the boosting circuit 42 (offset voltage Vos(swon)<offset voltage Vos(swoff)). Accordingly, because the voltage values of the offset voltages Vos that are added to the output voltage Vout are different, a state arises in which the output voltage Vout(swoff)≠the output voltage Vout(swon), in the same way as when the boosting circuit 42 operates normally. Note that, in this case, on the basis of the output voltage Vout(swoff) when a state arises in which the offset voltage Vos(swon) <offset voltage Vos(swoff) in this way, and the output voltage Vout(swoff) when the boosting circuit 42 operates normally, a predetermined range in which it can be diagnosed that the boosting circuit 42 operates normally is determined in advance for the difference between the output voltage Vout (swoff) and the output voltage Vout(swon) for example, and it suffices to diagnose whether or not the boosting circuit 42 is in an abnormal state in accordance with whether or not the output voltage Vout(swoff)−the output voltage Vout(swon) is in that predetermined range.

Further, there is the abnormal state in which the boosting circuit 42 negatively boosts the power supply voltage VCC, i.e., the power supply voltage VCC becomes power supply voltage VCC>the driving voltage VCC1. In this case, at the buffer amplifier, a state arises in which the input voltage Vx>the driving voltage VCC1. Generally, this is due to an amplifier that cannot handle the input voltage Vx that exceeds the driving voltage, or that has been damaged. However, when considering a case in which the buffer amplifier 30 operates normally even if the input voltage Vx that exceeds the driving voltage is inputted, because the output voltage Vx1 does not exceed the driving voltage VCC1, the voltage value is smaller than in a case in which the driving voltage VCC is supplied (a case in which the short circuiting SW 43 is on). Accordingly, a state arises in which the output voltage Vout(swon)>the output voltage Vout(swoff). In this case as well, there becomes a state in which the output voltage Vout(swoff)≠the output voltage Vout(swon), in the same way as when the boosting circuit 42 operates normally. However, as described with regard to the above-described abnormal state in which the boosting circuit 42 boosts the power supply voltage VCC to a voltage value of an extent that cannot operate the MOS transistor within the buffer amplifier 30 in the saturated region, a predetermined range of the output voltage Vout (swoff)−the output voltage Vout(swon), in which range it can be diagnosed that the boosting circuit 42 operates normally, is determined in advance, and it suffices to diagnose whether or not the boosting circuit 42 is in an abnormal state in accordance with whether or not the output voltage Vout(swoff)−the output voltage Vout(swon) is in that predetermined range.

Figure 4:
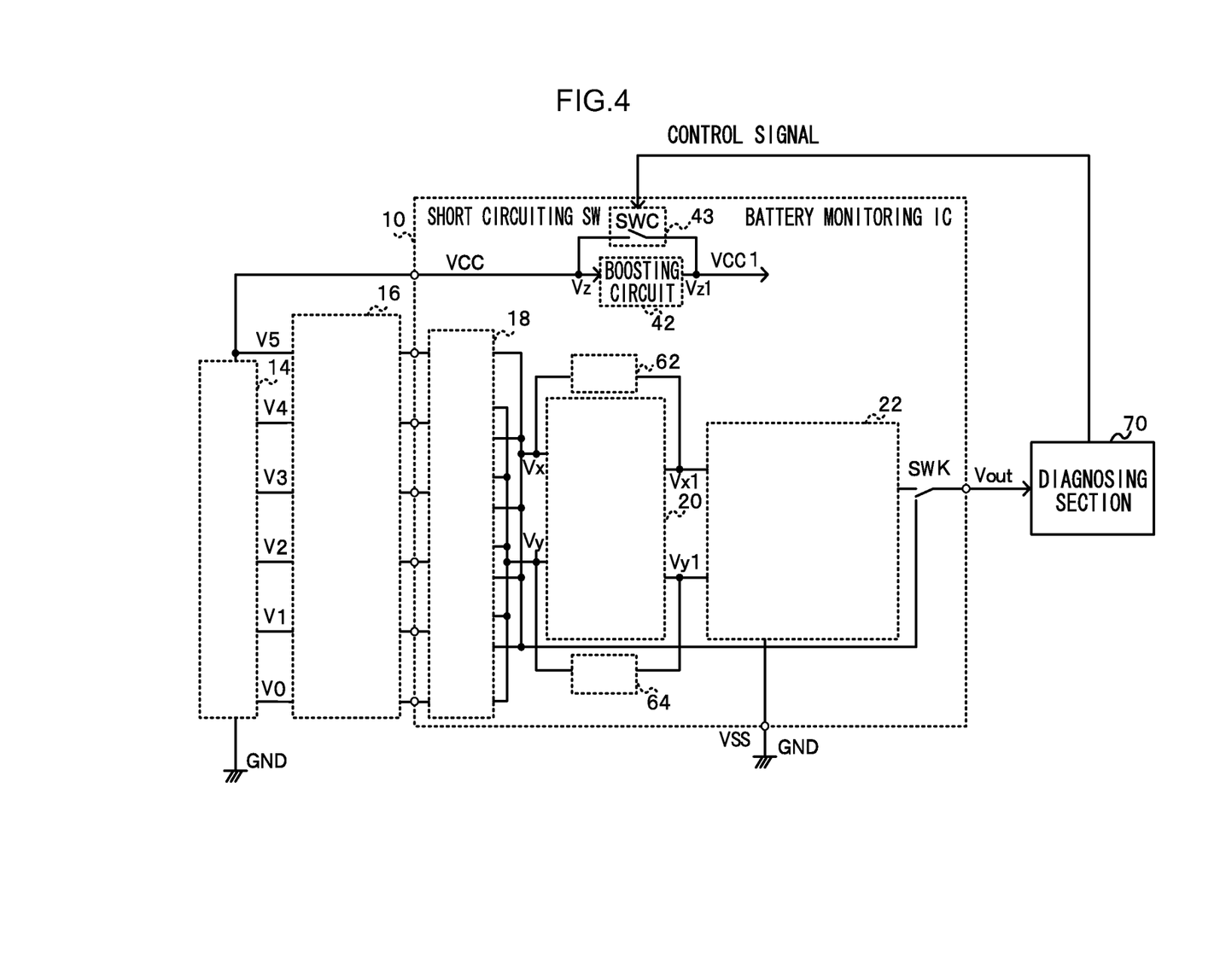
FIG. 4 is a schematic structural drawing for explaining an example of a diagnosing section that carries out abnormality diagnosis of a boosting circuit at the semiconductor device of the exemplary embodiment.

When carrying out such diagnosis of an abnormality of the boosting circuit 42, for example, a control signal that controls the on/off state of the short circuiting SW 43 is inputted from a diagnosing section 70 or the like (see FIG. 4) that is provided at the exterior of the battery monitoring IC 10, and comparison of the output voltage Vout(swoff) and the output voltage Vout(swon), or the like is carried out by the diagnosing section 70.

Figure 5:
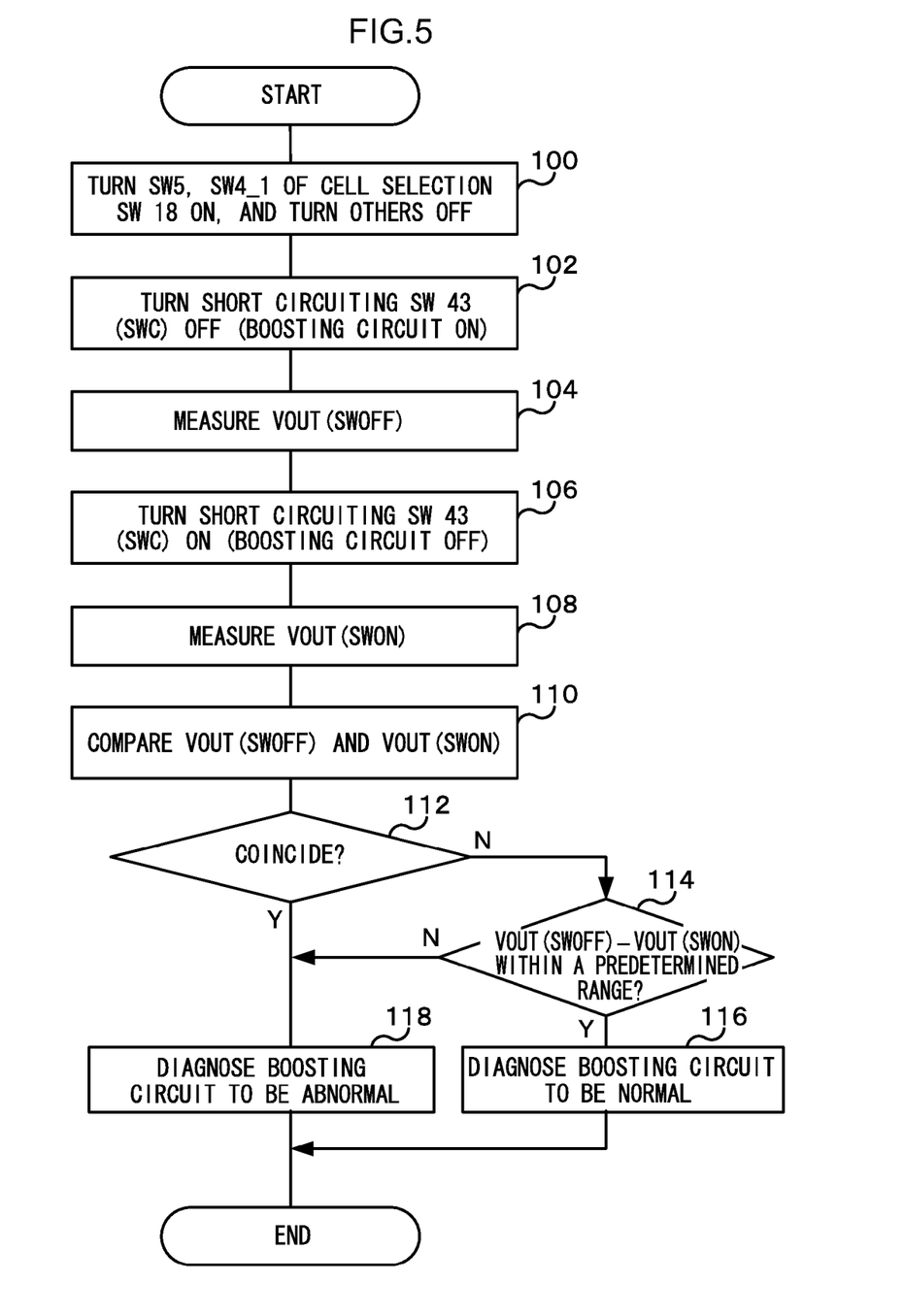
FIG. 5 is a flowchart of an example of the flow of abnormality diagnosing processing of a boosting circuit in the semiconductor device of the exemplary embodiment.

An example of the flow of abnormality diagnosing process of the boosting circuit 42 at the battery monitoring IC 10 of the present exemplary embodiment is shown in FIG. 5.

In step 100, in order to measure the voltage value of the battery cell Vc5 of the battery 14, the switching elements SW5, 4_1 of the cell selection SW 18 are turned on, and the other switching elements are turned off.

In next step 102, the short circuiting SW 43 is turned off (the boosting circuit 42 is turned on). Due thereto, the power supply voltage VCC is boosted to the driving voltage VCC1 by the boosting circuit 42 and supplied as the driving voltage of the buffer amplifier 30. In next step 104, the output voltage Vout(swoff) is measured.

In next step 106, a switching element SWC of the short circuiting SW 43 is turned on (the boosting circuit 42 is turned off). Due thereto, the power supply voltage VCC is, without going through the boosting circuit 42, supplied as is as the driving voltage of the buffer amplifier 30. In next step 108, the output voltage Vout(swon) is measured.

In next step 110, the output voltage Vout(swoff) and the output voltage Vout(swon) are compared, and, in next step 112, it is judged whether or not the output voltage Vout(swoff) and the output voltage Vout(swon) coincide. If they do coincide, the judgment is affirmative, and the routine moves on to step 118. Such a case is a case in which the above-described abnormal state in which the boosting circuit 42 is not operating at all has arisen. Therefore, in step 118, the boosting circuit 42 is diagnosed as being abnormal, and the diagnosing processing ends.

On the other hand, if it is judged in step 112 that the output voltage Vout(swoff) and the output voltage Vout(swon) do not coincide, the routine moves on to step 114. In step 114, it is judged whether or not the difference between the output voltage Vout(swoff) and the output voltage Vout(swon) is within the aforementioned predetermined range in which the boosting circuit 42 can be diagnosed as operating normally. When the difference between the output voltage Vout(swoff) and the output voltage Vout(swon) is within that predetermined range, the judgment is affirmative and the routine moves on to step 116 where the boosting circuit 42 is diagnosed as normal, and the diagnosing processing ends. On the other hand, if the difference between the output voltage Vout (swoff) and the output voltage Vout(swon) is not within that predetermined range, the judgment is negative and the routine moves on to step 118. This case is the above-described abnormal state in which VCC1 that has been boosted by the boosting circuit 42 is a voltage value of an extent that cannot cause the MOS transistor within the buffer amplifier 30 to operate in the saturated region, or is the abnormal state in which the boosting circuit 42 inverse-boosts the power supply voltage VCC. Therefore, in step 118, the boosting circuit 42 is diagnosed as being abnormal, and the diagnosing processing ends.

When, as a result of diagnosing the abnormal state of the boosting circuit 42 in this way, the boosting circuit 42 is diagnosed as operating normally, and further, the output voltage Vout is a voltage value that is thought to be abnormal, it can be judged that an abnormality has arisen at a portion other than the boosting circuit 42. Still further, as described above, by using the short circuiting SW 62, 64, it can be diagnosed whether the buffer amps 30, 32 are operating normally, and when both are operating normally, it can be diagnosed that an abnormality has arisen at the analog level shifter 22.

As described above, the battery monitoring IC 10 of the present exemplary embodiment is provided with the short circuiting SW 43 that includes the switching element SWC that shorts the input side and the output side of the boosting circuit 42 that boosts the power supply voltage VCC, that is supplied from the positive electrode side of the battery cell Vc5, to the driving voltage VCC1, that can drive the MOS transistor within the buffer amplifier 30 in the saturated region, and supplies the driving voltage VCC1 as the driving voltage of the buffer amplifier 30. Therefore, at times of measuring the voltage of the battery cell Vc5, when a voltage at which it is thought that the output voltage Vout is abnormal is measured, an abnormality of the boosting circuit 42 can be diagnosed by comparing the output voltage Vout(swoff), that is measured when the short circuiting SW 43 is turned off and the driving voltage VCC1 boosted by the boosting circuit 42 is supplied to the buffer amplifier 30, and the output voltage Vout(swon), that is measured when the short circuiting SW 43 is turned on and the power supply voltage VCC is, without going through the boosting circuit 42, supplied as is to the buffer amplifier 30. When the output voltage Vout(swoff) and the output voltage Vout(swon) coincide, the boosting circuit 42 is diagnosed as being abnormal. Further, when the output voltage Vout(swoff)−the output voltage Vout(swon) is within a predetermined range, the boosting circuit 42 is diagnosed as being normal, and, when this difference is not within the predetermined range, the boosting circuit 42 is diagnosed as being abnormal.

In this way, at the battery monitoring IC 10 of the present exemplary embodiment, an abnormality of the boosting circuit 42 can be diagnosed. Accordingly, when a voltage, at which it is thought that the output voltage Vout is abnormal, is measured, the place where a defect has arisen can be specified.

Note that the short circuiting SW 43, the short circuiting SW 62, 64 and the switching element SWK of the present exemplary embodiment may be switching elements that control physical bypass paths, or may be logic control switching elements that that functionally switch between ENABLE and DISABLE (on and off), and are not particularly limited.

Further, although the present exemplary embodiment describes a case in which the battery 14 is provided with five battery cells (the battery cells Vc1 through Vc5), the present invention is not limited to the same, and the number of battery cells is not particularly limited provided that plural battery cells are connected in series.

Moreover, the present exemplary embodiment describes a case in which the LPF 16 is structured as a π-type in which the capacitors Cf1 through Cf5 are connected between the battery cells Vc1 through Vc5, but the present invention is not limited to the same. For example, the LPF may be structured as a ground-type in which the capacitors Cf1 through Cf5 are connected between GND and the positive electrode sides of the battery cells Vc1 through Vc5.

What is claimed is:

1. A semiconductor device comprising:
   a plurality of switching elements that are connected via a low-pass filter respectively to a plurality of batteries connected in series, and that select any one of the plurality of batteries connected in series;
   a first buffer amplifier that is structured to include a transistor driven by power supply voltage supplied from the plurality of batteries connected in series, and to which voltage of one end of a battery selected by the switching elements is inputted, and that has an input impedance of a magnitude that limits current that flows from the low-pass filter to the switching elements;
   a second buffer amplifier that is structured to include a transistor driven by the power supply voltage, and to which voltage of another end of the battery selected by the switching elements is inputted, and that has an input impedance of a magnitude that limits current that flows from the low-pass filter to the switching elements;
   a level shifter that is driven by the power supply voltage, and that outputs a difference between a voltage outputted from the first buffer amplifier and a voltage outputted from the second buffer amplifier;
   a boosting section that boosts the power supply voltage to a voltage value for operating, in a saturated region, the transistor included in the first buffer amplifier and the transistor included in the second buffer amplifier; and
   a short circuiting element that short-circuits an input side and an output side of the boosting section on the basis of a control signal.

2. The semiconductor device of claim 1, wherein the short circuiting element short circuits the input side and the output side of the boosting section on the basis of a control signal, when abnormality diagnosis of the boosting section is carried out.

3. The semiconductor device of claim 1, further comprising a switch element that, when the switching elements select a battery whose one end is connected to ground from among the plurality of batteries connected in series, switches voltage, that is outputted to an exterior, from voltage that is outputted from the level shifter to voltage of another end of the battery that the switching elements selected.

4. The semiconductor device of claim 1, further comprising:
   a first connecting element for connecting an input terminal and an output terminal of the first buffer amplifier, in order for current to flow without going through the first buffer amplifier; and a second connecting element for connecting an input terminal and an output terminal of the second buffer amplifier, in order for current to flow without going through the second buffer amplifier.

5. A method of diagnosing an abnormality of a boosting section of a semiconductor device, the method comprising:
in the semiconductor device of claim 1, on the basis of a power supply voltage that is supplied via the boosting section and that has been boosted to a voltage value for operating the transistor included in the first buffer amplifier and the transistor included in the second buffer amplifier in a saturated region, driving the first buffer amplifier and the second buffer amplifier, and measuring a first voltage value of a battery;
in the semiconductor device, on the basis of the power supply voltage that short-circuits the input side and the output side of the boosting section by the short circuiting element and that is supplied without having gone through the boosting section, driving the first buffer amplifier and the second buffer amplifier, and measuring a second voltage value of the battery; and
comparing the first voltage value and the second voltage value.

6. The method of diagnosing an abnormality of a boosting section of a semiconductor device of claim 5, further comprising, as a result of comparing the first voltage value and the second voltage value, diagnosing that the boosting circuit is abnormal when the first voltage value and the second voltage value are the same.

7. The method of diagnosing an abnormality of a boosting section of a semiconductor device of claim 5, further comprising, as a result of comparing the first voltage value and the second voltage value, diagnosing that the boosting circuit is normal when a difference between the first voltage value and the second voltage value is within a predetermined range.

8. An assembled battery system that comprises a battery configured to include a plurality of battery cells connected in series and detects a voltage of each of the battery cells, the assembled battery system comprising:
a first buffer amplifier, to which voltage of a higher level potential of the battery cell to be detected is inputted and that outputs a first voltage corresponding to the inputted voltage;
a second buffer amplifier, to which voltage of a lower-level potential of the battery cell to be detected is inputted and that outputs a second voltage corresponding to the inputted voltage;
a difference outputting section that outputs a difference between the first voltage and the second voltage;
a boosting section that controls boosting voltage of the battery to supply as a driving voltage to the first buffer amplifier and the second buffer amplifier; and
a controlled section, at which a control is conducted on whether or not the voltages to be supplied to the first buffer amplifier and the second buffer amplifier are to be boosted by the boosting section,
wherein the first buffer amplifier and the second buffer amplifier restrict current from the battery flow to the difference of putting section.

9. The assembled battery system of claim 8, wherein
the first buffer amplifier comprises a first transistor having a gate electrode, to which the higher level potential of the battery cell to be detected is inputted, and a source electrode, to which voltage originated from the battery is inputted as the driving voltage;
the first voltage is outputted in response to operation of the first transistor;
the second buffer amplifier comprises a second transistor having a gate electrode, to which the lower level potential of the battery cell to be detected is inputted, and a source electrode, to which voltage originated from the battery is inputted as the driving voltage; and
the second voltage is outputted in response to operation of the second transistor.

10. The assembled battery system of claim 9, wherein
the boosting of the voltage of the battery by the boosting section is conducted so as to make the first transistor and the second transistor operate in a predetermined saturated region.

11. The assembled battery system of claim 8, wherein
the battery cell to be detected is connected to the first buffer amplifier at the second buffer amplifier via resistors.

12. The assembled battery system of claim 8, wherein
at the controlled section, the control on whether or not the voltage to be supplied to the first buffer amplifier and the second buffer amplifier are to be boosted, is conducted based on a control signal.

13. The assembled battery system of claim 8, wherein
the controlled section comprises a switching circuit that is provided between the first buffer amplifier and the second buffer amplifier in parallel with the boosting section; and
whether or not the voltages to be supplied to the first buffer amplifier and the second buffer amplifier are to be boosted, is determined based on the switching of the switching circuit.

14. The assembled battery system of claim 10, wherein
the resistor configures a low-pass filter with a capacitor.

15. The assembled battery system of claim 8, wherein
the voltages to be supplied to the first buffer amplifier and the second buffer amplifier are boosted by the boosting section to detect the voltage of the battery cell to be detected.

16. The assembled battery system of claim 8, wherein
determination of whether the boosting section is normal or abnormal is made by comparing a first output voltage and a second output voltage, the first output voltage being outputted by the difference of putting section when the voltage to be supplied to the first buffer amplifier and the second buffer amplifier are boosted by the boosting section, and the second output voltage being outputted by the difference of putting section when the voltages to be supplied to the first buffer amplifier and the second buffer amplifier are not boosted by the boosting section.

17. The assembled battery system of claim 16, wherein
the boosting section is determined as abnormal if a difference between the first output voltage and the second output voltage is within a predetermined range.

18. A method of diagnosing an abnormality of a boosting section of the assembled battery system of claim 8, the method comprising:
determining whether the boosting section is normal or abnormal by comparing a first output voltage and a second output voltage, the first output voltage being outputted by the difference of putting section when the voltages to be supplied to the first buffer amplifier and the second buffer amplifier are boosted by the boosting section, and the second output voltage being outputted by difference of putting section when the voltages to be supplied to the first buffer amplifier and the second buffer amplifier are not boosted by the boosting section.

19. The method of diagnosing an abnormality of a boosting section of claim 18, wherein the boosting section is determined as abnormal if a difference between the first output voltage and the second output voltage is within a predetermined range.

20. A battery monitoring IC for detecting, in a battery that is configured to include a plurality of battery cells connected in series, a voltage of each of the battery cells, the battery monitoring IC comprising:
  a first buffer amplifier, to which voltage of a higher level potential of the battery cell to be detected is inputted and that outputs a first voltage corresponding to the inputted voltage;
  a second buffer amplifier, to which voltage of a lower level potential of the battery cell to be detected is inputted and that outputs a second voltage corresponding to the inputted voltage;
  a difference outputting section that outputs a difference between the first voltage and the second voltage;
  a boosting section that controls boosting voltage of the battery to supply as driving voltages to the first buffer amplifier and the second buffer amplifier; and
  a controlled section, at which a control is conducted on whether or not the voltages to be supplied to the first buffer amplifier and the second buffer amplifier are to be boosted by the boosting section, wherein
  the first buffer amplifier and the second buffer amplifier restrict current from the battery flow through the difference of putting section.

\* \* \* \* \*